US012634957B2

(12) United States Patent
Tang et al.

(10) Patent No.: US 12,634,957 B2
(45) Date of Patent: May 19, 2026

(54) METHODS AND APPARATUS FOR MESSAGE 4 TRANSMISSION

(71) Applicant: MediaTek Singapore Pte. Ltd., Singapore (SG)

(72) Inventors: Wen Tang, Beijing (CN); Gilles Charbit, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 302 days.

(21) Appl. No.: 18/407,403

(22) Filed: Jan. 8, 2024

(65) Prior Publication Data

US 2024/0244633 A1 Jul. 18, 2024

(51) Int. Cl.
| | |
|---|---|
| *H04W 72/232* | (2023.01) |
| *H04L 1/00* | (2006.01) |
| *H04L 1/1812* | (2023.01) |
| *H04W 72/1273* | (2023.01) |

(52) U.S. Cl.
CPC ......... *H04W 72/232* (2023.01); *H04L 1/0003* (2013.01); *H04L 1/0061* (2013.01); *H04L 1/1812* (2013.01); *H04W 72/1273* (2013.01)

(58) Field of Classification Search
CPC ....... H04L 1/1864; H04L 1/0061; H04L 1/08; H04L 1/1896; H04L 1/0003; H04L 1/1812; H04L 1/189; H04W 72/232; H04W 72/1273
See application file for complete search history.

(56) References Cited

U.S. PATENT DOCUMENTS

| | | | | |
|---|---|---|---|---|
| 12,238,641 | B2 * | 2/2025 | Kim .................. | H04W 74/0825 |
| 2024/0243895 | A1 * | 7/2024 | Rastegardoost ...... | H04W 72/51 |
| 2024/0244667 | A1 * | 7/2024 | Echigo .............. | H04W 74/0866 |
| 2024/0364414 | A1 * | 10/2024 | Wanuga ............. | H04B 7/15528 |
| 2024/0430930 | A1 * | 12/2024 | Kim ....................... | H04W 72/23 |
| 2025/0008567 | A1 * | 1/2025 | Lei ................... | H04W 74/0833 |
| 2025/0038892 | A1 * | 1/2025 | Cui ....................... | H04L 5/0055 |
| 2025/0081288 | A1 * | 3/2025 | Moon .................... | H04W 76/28 |
| 2025/0150979 | A1 * | 5/2025 | Shibaike .............. | H04W 74/08 |
| 2025/0184789 | A1 * | 6/2025 | Noh ..................... | H04W 72/231 |
| 2025/0330297 | A1 * | 10/2025 | Cozzo .............. | H04W 74/0833 |
| 2026/0006650 | A1 * | 1/2026 | Shibaike ........... | H04W 74/0836 |

* cited by examiner

*Primary Examiner* — Syed Ali

(74) *Attorney, Agent, or Firm* — Andy M. Han; Han IP PLLC

(57) ABSTRACT

Various solutions for Message 4 (Msg4) transmission with respect to user equipment and network node in mobile communications are described. An apparatus may determine whether at least one repetition factor for Msg4 is configured in a system information block (SIB) from a network node. The apparatus may determine whether an indication for Msg4 repetition is configured in a downlink control information (DCI) from the network node. The apparatus may determine a number of repetitions for Msg4 based on at least one of the SIB and the DCI. The apparatus may receive one or more Msg4s from the network node according to the number of repetitions. The apparatus may transmit one or more Msg4 Hybrid Automatic Repeat Request (HARQ)-acknowledgements (ACKs) to the network node according to the number of repetitions.

17 Claims, 6 Drawing Sheets

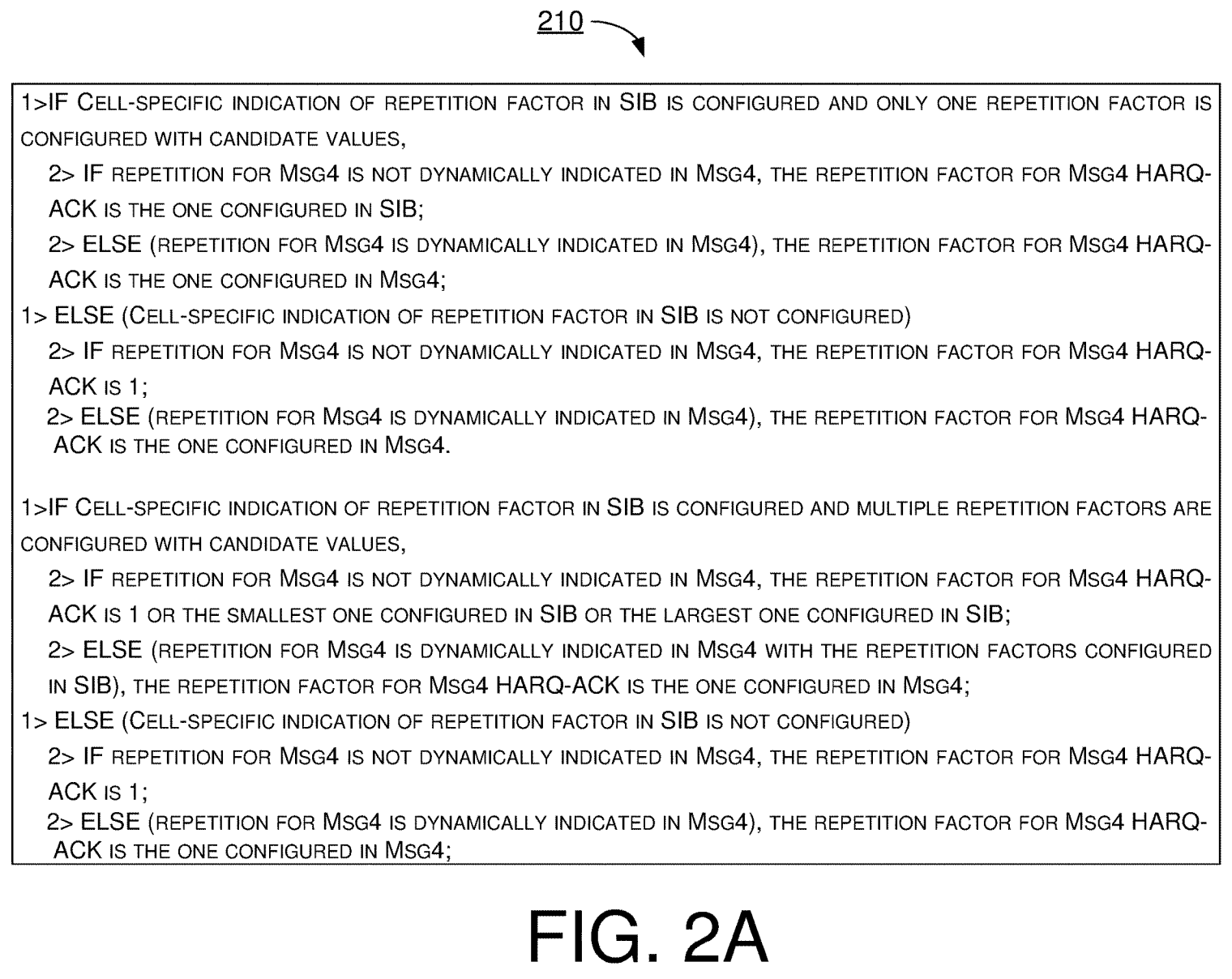

210

1>IF CELL-SPECIFIC INDICATION OF REPETITION FACTOR IN SIB IS CONFIGURED AND ONLY ONE REPETITION FACTOR IS CONFIGURED WITH CANDIDATE VALUES,

2> IF REPETITION FOR MsG4 IS NOT DYNAMICALLY INDICATED IN MsG4, THE REPETITION FACTOR FOR MsG4 HARQ-ACK IS THE ONE CONFIGURED IN SIB;

2> ELSE (REPETITION FOR MsG4 IS DYNAMICALLY INDICATED IN MsG4), THE REPETITION FACTOR FOR MsG4 HARQ-ACK IS THE ONE CONFIGURED IN MsG4;

1> ELSE (CELL-SPECIFIC INDICATION OF REPETITION FACTOR IN SIB IS NOT CONFIGURED)

2> IF REPETITION FOR MsG4 IS NOT DYNAMICALLY INDICATED IN MsG4, THE REPETITION FACTOR FOR MsG4 HARQ-ACK IS 1;

2> ELSE (REPETITION FOR MsG4 IS DYNAMICALLY INDICATED IN MsG4), THE REPETITION FACTOR FOR MsG4 HARQ-ACK IS THE ONE CONFIGURED IN MsG4.

1>IF CELL-SPECIFIC INDICATION OF REPETITION FACTOR IN SIB IS CONFIGURED AND MULTIPLE REPETITION FACTORS ARE CONFIGURED WITH CANDIDATE VALUES,

2> IF REPETITION FOR MsG4 IS NOT DYNAMICALLY INDICATED IN MsG4, THE REPETITION FACTOR FOR MsG4 HARQ-ACK IS 1 OR THE SMALLEST ONE CONFIGURED IN SIB OR THE LARGEST ONE CONFIGURED IN SIB;

2> ELSE (REPETITION FOR MsG4 IS DYNAMICALLY INDICATED IN MsG4 WITH THE REPETITION FACTORS CONFIGURED IN SIB), THE REPETITION FACTOR FOR MsG4 HARQ-ACK IS THE ONE CONFIGURED IN MsG4;

1> ELSE (CELL-SPECIFIC INDICATION OF REPETITION FACTOR IN SIB IS NOT CONFIGURED)

2> IF REPETITION FOR MsG4 IS NOT DYNAMICALLY INDICATED IN MsG4, THE REPETITION FACTOR FOR MsG4 HARQ-ACK IS 1;

2> ELSE (REPETITION FOR MsG4 IS DYNAMICALLY INDICATED IN MsG4), THE REPETITION FACTOR FOR MsG4 HARQ-ACK IS THE ONE CONFIGURED IN MsG4;

FIG. 2A

_PDSCH-CONFIGCOMMON_ INFORMATION ELEMENT

-- ASN1START

-- TAG-PDSCH-CONFIGCOMMON-START

PDSCH-CONFIGCOMMON ::=          SEQUENCE {

PDSCH-TIMEDOMAINALLOCATIONLIST    PDSCH-TIMEDOMAINRESOURCEALLOCATIONLIST

OPTIONAL,  -- NEED R

PDSCH-AGGREGATIONFACTOR    ENUMERATED { N1, N2, N4, N8 }

OPTIONAL,  -- NEED S

...

}

-- TAG-PDSCH-CONFIGCOMMON-STOP

-- ASN1STOP

220

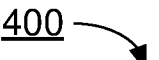

DETERMINE, BY A PROCESSOR OF A USER EQUIPMENT (UE), WHETHER AT LEAST ONE REPETITION FACTOR FOR MESSAGE 4 (MSG4) IS CONFIGURED IN A SYSTEM INFORMATION BLOCK (SIB) FROM A NETWORK NODE
410

DETERMINE, BY THE PROCESSOR, WHETHER AN INDICATION FOR MSG4 REPETITION IS CONFIGURED IN A DOWNLINK CONTROL INFORMATION (DCI) FROM THE NETWORK NODE
420

DETERMINE, BY THE PROCESSOR, A NUMBER OF REPETITIONS FOR MSG4 BASED ON AT LEAST ONE OF THE SIB AND THE DCI
430

RECEIVE, BY THE PROCESSOR, ONE OR MORE MSG4S FROM THE NETWORK NODE ACCORDING TO THE NUMBER OF REPETITIONS FOR MSG4
440

TRANSMIT, BY THE PROCESSOR, ONE OR MORE MSG4 HYBRID AUTOMATIC REPEAT REQUEST (HARQ)-ACKNOWLEDGEMENTS (ACKS) TO THE NETWORK NODE ACCORDING TO THE NUMBER OF REPETITIONS FOR MSG4
450

FIG. 4

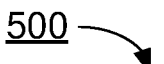

500

CONFIGURE, BY A PROCESSOR OF A NETWORK NODE, AT LEAST ONE REPETITION FACTOR FOR MESSAGE 4 (MSG4) TO A USER EQUIPMENT (UE) THROUGH AT LEAST ONE OF A SYSTEM INFORMATION BLOCK (SIB) AND A DOWNLINK CONTROL INFORMATION (DCI)
510

TRANSMIT, BY THE PROCESSOR, ONE OR MORE MSG4S TO THE UE ACCORDING TO THE AT LEAST ONE REPETITION FACTOR FOR MSG4
520

RECEIVING, BY THE PROCESSOR, ONE OR MORE MSG4 HYBRID AUTOMATIC REPEAT REQUEST (HARQ)-ACKNOWLEDGEMENTS (ACKS) FROM THE UE ACCORDING TO THE AT LEAST ONE REPETITION FACTOR FOR MSG4 IN AT LEAST ONE OF THE SIB AND THE DCI
530

FIG. 5

METHODS AND APPARATUS FOR MESSAGE 4 TRANSMISSION

CROSS REFERENCE TO RELATED PATENT APPLICATION(S)

The present disclosure is part of a non-provisional application claiming the priority benefit of China Patent Application No. 202410009836.1, filed 3 Jan. 2024 and claiming the priority benefit of PCT Application No. PCT/CN2023/071926, filed 12 Jan. 2023. Contents of aforementioned applications are herein incorporated by reference in their entirety.

TECHNICAL FIELD

The present disclosure is generally related to mobile communications and, more particularly, to message 4 (Msg4) transmission with respect to user equipment (UE) and network apparatus in mobile communications.

BACKGROUND

Unless otherwise indicated herein, approaches described in this section are not prior art to the claims listed below and are not admitted as prior art by inclusion in this section.

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The 3rd generation partner project (3GPP) network normally includes a hybrid of 2G/3G/4G systems. The next generation mobile network (NGMN) board has decided to focus the future NGMN activities on defining the end-to-end requirements for 5G new radio (NR) systems and 6G systems.

In convention technology, when a user equipment (UE) performs a physical uplink shared channel (PUSCH) transmission which is scheduled by a random access response (RAR) uplink (UL) grant, but the UE has not been provided a cell-radio network temporary identifier (C-RNTI), the UE may attempt to detect a downlink control information (DCI) format 1_0 with cyclic redundancy check (CRC) scrambled by a temporary C-RNTI (TC-RNTI). The TC-RNTI may schedule a PDSCH that includes a UE contention resolution identity. In convention technology, Msg4 with the UE contention resolution identity information is not transmitted repetitively. However, in the applications with large coverage requirements, e.g., new radio (NR) non-terrestrial network (NTN) system, in order to meet the coverage requirements, effective enhancements for Msg4 transmission and reception will be needed.

Accordingly, how to perform the Msg4 transmission more effectively becomes an important issue for the newly developed wireless communication network. Therefore, there is a need to provide proper schemes and designs for the Msg4 transmission.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to propose schemes, concepts, designs, systems, methods and apparatus pertaining to Message 4 (Msg4) transmission. It is believed that the above-described issue would be avoided or otherwise alleviated by implementing one or more of the proposed schemes described herein.

In one aspect, a method may involve an apparatus determining whether at least one repetition factor for Message 4 (Msg4) is configured in a system information block (SIB) from a network node. The method may also involve the apparatus determining whether an indication for Msg4 repetition is configured in a downlink control information (DCI) from the network node. The method may further involve the apparatus determining the number of repetitions for Msg4 based on at least one of the SIB and the DCI. The method may further involve the apparatus receiving one or more Msg4s from the network node according to the number of repetitions for Msg4. The method may further involve the apparatus transmitting one or more Msg4 Hybrid Automatic Repeat Request (HARQ)-acknowledgements (ACKs) to the network node according to the number of repetitions for Msg4.

In another aspect, an apparatus may involve a transceiver which, during operation, wirelessly communicates with at least one network node. The apparatus may also involve a processor communicatively coupled to the transceiver such that, during operation, the processor may determine whether at least one repetition factor for Msg4 is configured in a SIB from the network node. The processor may also determine whether an indication for Msg4 repetition is configured in a DCI from the network node. The processor may further determine a number of repetitions for Msg4 based on at least one of the SIB and the DCI. The processor may further receive, via the transceiver, one or more Msg4s from the network node according to the number of repetitions for Msg4. The processor may further transmit, via the transceiver, one or more Msg4 HARQ-ACKs to the network node according to the number of repetitions for Msg4.

In another aspect, a method may involve a network node configuring at least one repetition factor for Msg4 to a UE through at least one of a SIB and a DCI. The method may further involve the network node transmitting one or more Msg4s to the UE according to the at least one repetition factor for Msg4. The method may further involve the network node receiving one or more Msg4 HARQ-ACKs from the UE according to the at least one repetition factor for Msg4 in at least one of the SIB and the DCI.

It is noteworthy that, although description provided herein may be in the context of certain radio access technologies, networks and network topologies such as $5^{th}$ Generation System (5GS) and 4G EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), E-UTRAN, Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, IoT, Industrial IoT (IIoT), Narrow Band Internet of Things (NB-IOT), non-terrestrial network (NTN) communication, 6G system and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2A is a diagram depicting an example scenario of the repetition factor for Msg4 transmission in accordance with implementations of the present disclosure.

FIG. 4 is a flowchart of an example process in accordance with an implementation of the present disclosure.

FIG. 5 is a flowchart of another example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.
Overview Implementations in accordance with the present disclosure relate to various techniques, methods, schemes and/or solutions pertaining to Message 4 (Msg4) transmission. According to the present disclosure, a number of possible solutions may be implemented separately or jointly. That is, although these possible solutions may be described below separately, two or more of these possible solutions may be implemented in one combination or another.

Figure 1:
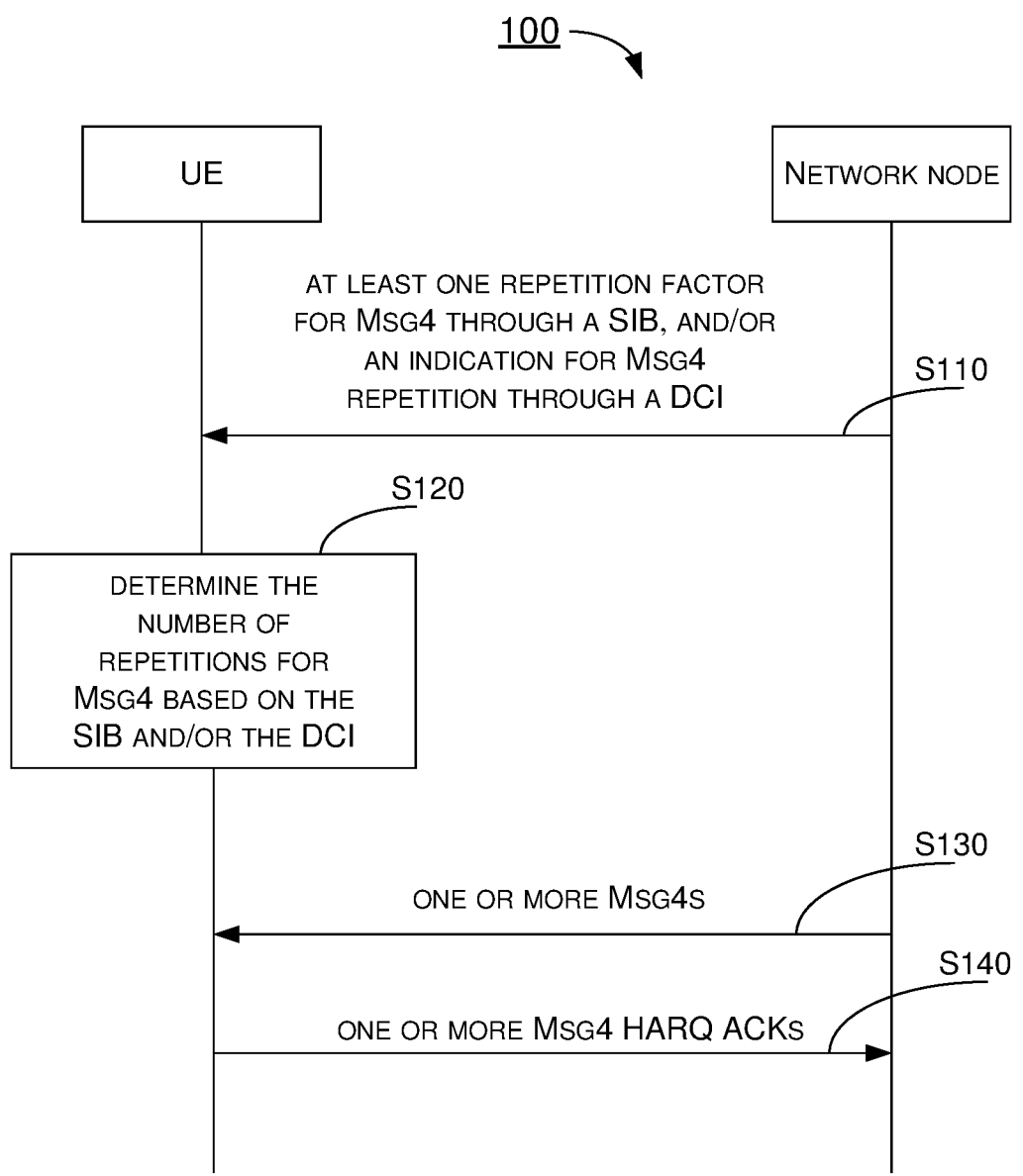
FIG. 1 is a diagram depicting an example scenario of Message 4 (Msg4) transmission under schemes in accordance with implementations of the present disclosure.

FIG. 1 illustrates an example scenario 100 for Msg4 transmission under schemes in accordance with implementations of the present disclosure. Scenario 100 involves a network node (e.g., a macro base station and a micro base station) and a UE, which may be a part of a wireless communication network (e.g., an LTE network, a 5G/NR network, an IoT network or a 6G network). Referring to FIG. 1, in step S110, the network node may configure at least one repetition factor (or cell-specific repetition factor/UE-specific repetition factor) for Msg4 through a system information block (SIB), and/or a downlink control information (DCI). In an example, in step S110, the network node may configure multiple repetition factors for Msg4 through at least one of the SIB and the DCI. In another example, in step S110, the network node may configure only one repetition factor for Msg4 through the SIB or the DCI. In an example, the network node may dynamically configure the one or more repetition factors for Msg4 through the DCI, SIB or Msg4. In an example, the cell-specific repetition factor may be configured via the SIB and the indication for Msg4 repetition may be configured via the DCI in the physical downlink control channel (PDCCH).

Then, in step S120, the UE may determine the number of repetitions for Msg4 based on the SIB and/or the DCI. Specifically, in step S120, the UE may determine whether at least one repetition factor for Msg4 is configured in the SIB from the network node, and determine whether an indication for Msg4 repetition is configured in the DCI from the network node first. Then, the UE may determine the number of repetitions for Msg4 based on the SIB, the DCI, or the SIB and the DCI.

In Step S130, the UE may receive one or more Msg4s with the UE contention resolution identity information based on the repetition factor for Msg4.

In step S140, the UE may transmit one or more Msg4 Hybrid Automatic Repeat Request (HARQ)-acknowledgements (ACKs) (or negative-ACKs (NACKs)) according to the number of repetitions for Msg4.

In accordance with implementations of the present disclosure, when the repetition factor for Msg4 is configured by the network node through the SIB, but the indication for Msg4 repetition is not configured by the network node through the DCI (e.g., no indication for Msg4 repetition is configured in the DCI), the UE may determine the number of repetitions for Msg4 based on the SIB.

In an example, when only one repetition factor for Msg4 is configured in the SIB, the UE may determine the number of repetitions for Msg4 based on this repetition factor for Msg4. In another example, when a plurality of repetition factors for Msg4 are configured in the SIB, the UE may determine the number of repetitions for Msg4 based one of the repetition factors for Msg4. For example, the UE may determine the number of repetitions for Msg4 based on the smallest one of the repetition factors for Msg4. For another example, the UE may determine the number of repetitions for Msg4 based on the largest one of the repetition factors for Msg4. For another example, the UE may determine the number of repetitions for Msg4 based on the predefined one of the repetition factors for Msg4. For another example, the UE may determine the number of repetitions for Msg4 is 1 directly (i.e., utilizing a value of 1 as the number of the repetitions).

FIG. 2A illustrates an example scenario 210 of the repetition factor for Msg4 transmission. In the scenario, the cell-specific repetition factors may be configured via the SIB (e.g. SIB1) and the UE-specific repetition factor may be dynamically indicated by the network node (e.g., gNB) with Msg4. In an example, a cell-specific indication of one or more repetition factors is indicated in the SIB and only one repetition factor is configured with candidate values (case A). In another example, none of repetition factors is configured in the SIB (case B). In another example, a cell-specific indication of a plurality of repetition factors is indicated in the SIB and multiple repetition factors are configured with candidate values (case C). When the repetition factor for Msg4 is not dynamically indicated in Msg4 under the case A, the UE may perform Msg4 HARQ-ACK repetition based on the repetition factor same as the one configured via the SIB. When the repetition factor for Msg4 is dynamically indicated in Msg4 under the case A, the UE may perform Msg4 HARQ-ACK repetition based on the repetition factor configured in Msg4. When the repetition factor for Msg4 is not dynamically indicated in Msg4 under the case B, the UE may perform Msg4 HARQ-ACK repetition with the value of 1. When the repetition factor for Msg4 is dynamically indicated in Msg4 under the case B, the UE may perform Msg4 HARQ-ACK repetition based on the repetition factor configured in Msg4. When the repetition factor for Msg4 is not dynamically indicated in Msg4 under the case C, the UE may perform Msg4 HARQ-ACK repetition based on the repetition factor of value 1 or the smallest one or the largest one among the multiple repetition factors configured via the SIB. When the repetition factor for Msg4 is dynamically indicated in Msg4 under the case C, the UE may perform Msg4 HARQ-ACK repetition based on the repetition factor configured in Msg4. In accordance with implementations of the present disclosure, the repetition factor (or repetition factors) for Msg4 may be configured through a present parameter (e.g., pdsch-AggregationFactor in PDSCH-ConfigCommon information element) of the SIB. In an example, the present parameter may be applied to a physical downlink shared channel (PDSCH) transmission using a common PDSCH resource. In another example, the configured one or more repetition factors in the present parameter may be applied to any PDSCH transmission in an event that a dedicated PDSCH resource is not configured. The SIB may indicate whether to apply the determined number of repetitions for Msg4 to the PDSCH transmission using the common PDSCH resource in an event that a dedicated PDSCH resources is not configured through an enabled or disabled configuration. In an example, the present parameter may indicate the number of repetitions for PDSCH for Msg4 in SIB. In another example, if the present parameter (or field) is absent in SIB, value 1 or the candidate values (e.g., {1, 2, 4, 8}) may be used as the number of repetitions for Msg4.

Figure 2B:
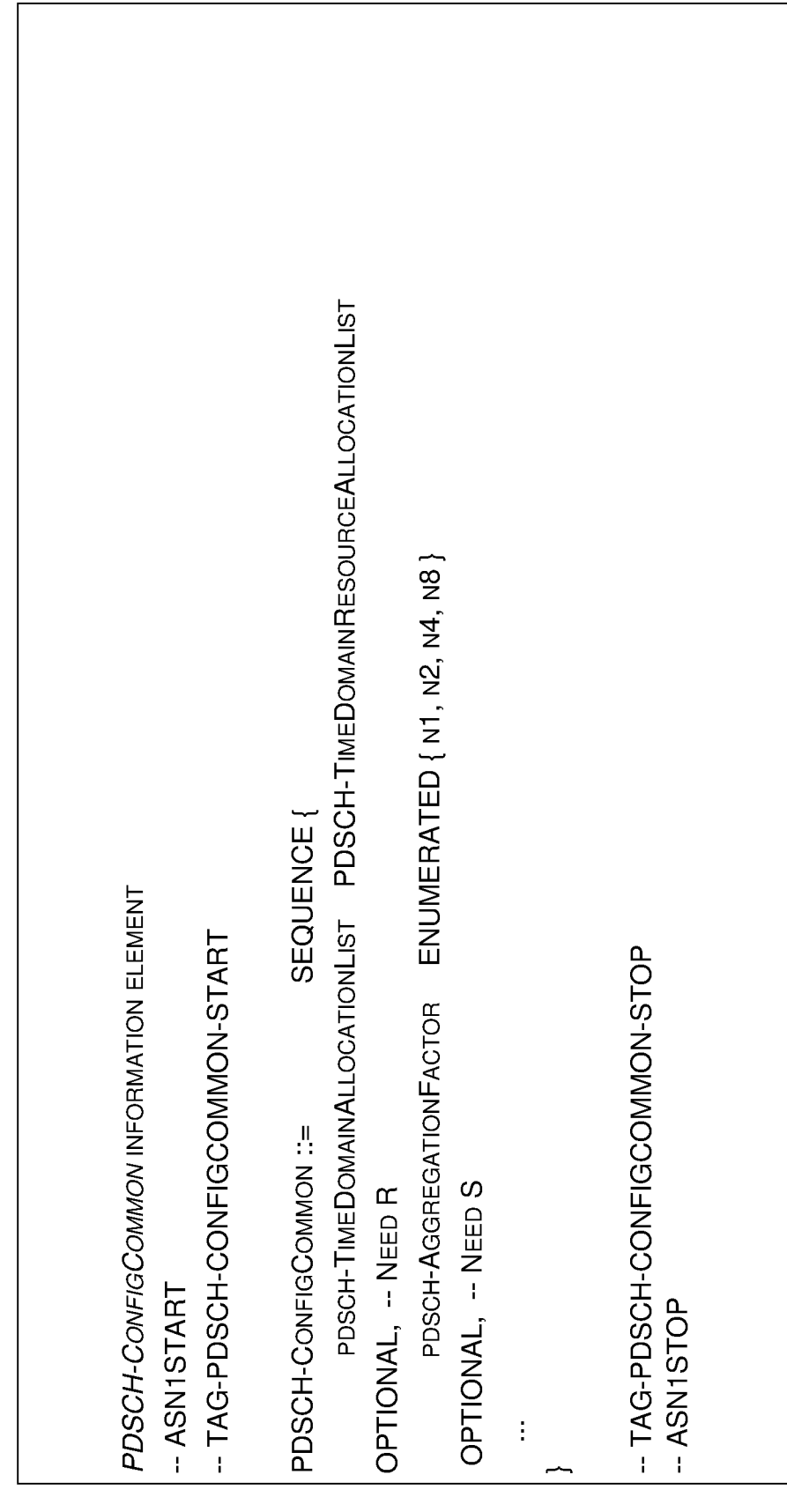
FIG. 2B is a diagram depicting another example scenario of the repetition factor for Msg4 transmission in accordance with implementations of the present disclosure

FIG. 2B illustrates another example scenario 220 of the repetition factor for Msg4 transmission. In the scenario, pdsch-AggregationFactor of PDSCH-ConfigCommon information element may be used to indicate the number of repetitions for Msg4. In an example, pdsch-Aggregation-Factor may indicate the number of repetitions for Msg4 is {n2} (e.g. 2), {n4, n8} (e.g. 4, 8), {n2, n4, n8} (e.g. 2, 4, 8) or {n1, n2, n4, n8} (e.g. 1, 2, 4, 8) and so on. When the field pdsch-AggregationFactor is absent, the UE may apply the value 1 or one or more values of the candidate values {1, 2, 4, 8}. In an example, other PDSCH transmission utilizing "PDSCH-ConfigCommon information element" may also be performed based on the configured repetition in this field. In another example, other PDSCH transmission may be performed with repetition number different from the configured repetition in this field. When the dedicated PDSCH resource configuration is not provided, the configured repetitions in pdsch-Aggregation Factor for Msg4 may be applied to any PDSCH transmission by using the common PDSCH resource configured by PDSCH-ConfigCommon information element.

In accordance with implementations of the present disclosure, when the repetition factor for Msg4 is configured by the network node through the SIB, and the indication for Msg4 repetition is configured by the network node through the DCI on the PDCCH, the UE may determine the number of repetitions for Msg4 based on the SIB and the DCI. In an example, the indication for Msg4 repetition may be configured in a field (e.g., a downlink assignment index field, a modulation and coding scheme (MCS) information field, or a new or dedicated field) of the DCI, and different values in the field may respectively indicate different values of a parameter (e.g., pdsch-AggregationFactor) for Msg4 in the SIB (e.g., the contents shown in Table 2, Table 4, and Table 6 below). That is, the repetition factor for Msg4 in SIB may be mapped to the indication for Msg4 repetition in the DCI. In addition, in an example, if there is only one repetition factor for Msg4 in the SIB, the UE may determine the number of repetitions for Msg4 based on the DCI.

In accordance with implementations of the present disclosure, when the repetition factor for Msg4 is not configured by the network node through the SIB (e.g., no repetition factor for Msg4 is configured in the SIB), but the UE-specific repetition factor or the repetition factor for Msg4 is configured by the network node through the DCI, the UE may determine the number of repetitions for Msg4 based on the DCI. In an example, the indication for Msg4 repetition may be configured in a field (e.g., a downlink assignment index field, a modulation and an MCS information field, or a new or dedicated field) of the DCI, and different values in the field may respectively indicate different numbers of repetitions for Msg4 (e.g., the contents shown in Table 1, Table 3, and Table 5 below).

In accordance with implementations of the present disclosure, the indication for Msg4 repetition may be configured in a downlink assignment index field of the DCI. In an example, different values in the downlink assignment index field may respectively indicate different numbers of repetitions for Msg4. In another example, different values in the downlink assignment index field may respectively indicate different values of a parameter (e.g., pdsch-AggregationFactor) for Msg4 in the SIB. The downlink assignment index field may use two bits to indicate the number of repetitions for Msg4. The downlink assignment index field may be a re-interpreted DCI field in the DCI format 1_0 with CRC scrambled by TC-RNTI. For example, as shown in Table 1, when the repetition factor for Msg4 is not configured in the SIB, or only one repetition factor (e.g., pdsch-Aggregation-Factor is configured with one repetition factor) for Msg4 is configured in the SIB, in the downlink assignment index field, the downlink assignment index "00" may indicate the number of repetitions for Msg4 is 1. The downlink assignment index "01" may indicate the number of repetitions for Msg4 is 2. The downlink assignment index "10" may indicate the number of repetitions for Msg4 is 4. The downlink assignment index "11" may indicate the number of repetitions for Msg4 is 8. In addition, as shown in Table 2, when a plurality of repetition factors (e.g., pdsch-Aggrega-tionFactor is configured with multiple repetition factors) for Msg4 are configured in the SIB, in the downlink assignment index field, the downlink assignment index "00" may correspond to the first value of pdsch-AggregationFactor in the SIB. The downlink assignment index "01" may correspond to the second value of pdsch-AggregationFactor in the SIB. The downlink assignment index "10" may correspond to the third value of pdsch-AggregationFactor in the SIB. The downlink assignment index "11" may correspond to the fourth value of pdsch-AggregationFactor in the SIB.

TABLE 1

| pdsch-AggregationFactor is not configured or configured with one repetition factor | |
|---|---|
| Downlink assignment index | Number of repetitions for Msg4 |
| 00 | 1 |
| 01 | 2 |
| 10 | 4 |
| 11 | 8 |

TABLE 2

| pdsch-AggregationFactor is configured with multiple repetition factors | |
|---|---|
| Downlink assignment index | Number of repetitions for Msg4 |
| 00 | First value of pdsch-AggregationFactor |
| 01 | Second value of pdsch-AggregationFactor |
| 10 | Third value of pdsch-AggregationFactor |
| 11 | Fourth value of pdsch-AggregationFactor |

In accordance with implementations of the present disclosure, the indication for Msg4 repetition may be configured in a MCS information field of the DCI. In an example, different values of most significant bit (MSB) bits in the MCS information field may respectively indicate different numbers of repetitions for Msg4. In another example, different values of MSB bits in the MCS information field may respectively indicate different values of a parameter (e.g., pdsch-AggregationFactor) for Msg4 in the SIB. The MCS information field may use two MSB bits to indicate the number of repetitions for Msg4. The MCS information field may be a re-interpreted DCI field in the DCI format 1_0 with CRC scrambled by TC-RNTI. For example, as shown in Table 3, when the repetition factor for Msg4 is not configured in the SIB, or only one repetition factor (e.g., pdsch-AggregationFactor is configured with one repetition factor) for Msg4 is configured in the SIB, in the MCS information field, the MSB bits "00" may indicate the number of repetitions for Msg4 is 1. The MSB bits "01" may indicate the number of repetitions for Msg4 is 2. The MSB bits "10" may indicate the number of repetitions for Msg4 is 4. The MSB bits "11" may indicate the number of repetitions for Msg4 is 8. In addition, as shown in Table 4, when a plurality of repetition factors (e.g., pdsch-AggregationFactor is configured with multiple repetition factors) for Msg4 are configured in the SIB, in the MCS information field, the MSB bits "00" may correspond to the first value of pdsch-AggregationFactor in the SIB. The MSB bits "01" may correspond to the second value of pdsch-AggregationFactor in the SIB. The MSB bits "10" may correspond to the third value of pdsch-AggregationFactor in the SIB. The MSB bits "11" may correspond to the fourth value of pdsch-AggregationFactor in the SIB.

TABLE 3

| pdsch-AggregationFactor is not configured or configured with one repetition factor | |
|---|---|
| 2 MSB bits of the MCS information field | Number of repetitions for Msg4 |
| 00 | 1 |
| 01 | 2 |
| 10 | 4 |
| 11 | 8 |

TABLE 4

| pdsch-AggregationFactor is configured with multiple repetition factors | |
|---|---|
| 2 MSB bits of the MCS information field | Number of repetitions for Msg4 |
| 00 | First value of pdsch-AggregationFactor |
| 01 | Second value of pdsch-AggregationFactor |
| 10 | Third value of pdsch-AggregationFactor |
| 11 | Fourth value of pdsch-AggregationFactor |

In accordance with implementations of the present disclosure, the indication for Msg4 repetition may be configured in a dedicated/new field of the DCI. In an example, different values in the dedicated field may respectively indicate different numbers of repetitions for Msg4. In another example, different values in the dedicated field may respectively indicate different values of a parameter (e.g., pdsch-AggregationFactor) for Msg4 in the SIB. The dedicated field may be a new repetition number field. The dedicated field may be a new DCI field in the DCI format 1_0 with CRC scrambled by TC-RNTI to indicate the number of repetitions for Msg4. For example, as shown in Table 5, when the repetition factor for Msg4 is not configured in the SIB, or only one repetition factor (e.g., pdsch-AggregationFactor is configured with one repetition factor) for Msg4 is configured in the SIB, in the dedicated field, the repetition number "00" may indicate the number of repetitions for Msg4 is 1. The repetition number "01" may indicate the number of repetitions for Msg4 is 2. The repetition number "10" may indicate the number of repetitions for Msg4 is 4. The repetition number "11" may indicate the number of repetitions for Msg4 is 8. In addition, as shown in Table 6, when a plurality of repetition factors (e.g., pdsch-AggregationFactor is configured with multiple repetition factors) for Msg4 are configured in the SIB, in the dedicated field, the repetition number "00" may correspond to the first value of pdsch-AggregationFactor in the SIB. The repetition number "01" may correspond to the second value of pdsch-AggregationFactor in the SIB. The repetition number "10" may correspond to the third value of pdsch-AggregationFactor in the SIB. The repetition number "11" may correspond to the fourth value of pdsch-AggregationFactor in the SIB.

TABLE 5

| one repetition factor Repetition Number | Number of repetitions for Msg4 |
|---|---|
| 00 | 1 |

TABLE 5-continued

| one repetition factor Repetition Number | Number of repetitions for Msg4 |
|---|---|
| 01 | 2 |
| 10 | 4 |
| 11 | 8 |

TABLE 6

| pdsch-AggregationFactor is configured with multiple repetition factors | |
|---|---|
| Repetition Number | Number of repetitions for Msg4 |
| 00 | First value of pdsch-AggregationFactor |
| 01 | Second value of pdsch-AggregationFactor |
| 10 | Third value of pdsch-AggregationFactor |
| 11 | Fourth value of pdsch-AggregationFactor |

In accordance with implementations of the present disclosure, when the repetition factor for Msg4 is not configured by the network node through the SIB (e.g., no repetition factor for Msg4 is configured in the SIB), and the indication for Msg4 repetition is also not configured by the network node through the DCI (e.g., no indication for Msg 4 repetition is configured in the DCI), the UE may determine the number of repetitions for Msg4 is 1.

The UE may perform Msg4 HARQ-ACK repetition based on the repetition factor(s) as indicated in SIB/SIB 1, DCI or Msg4 or perform Msg4 HARQ-ACK repetition based on value 1 or one of the candidate values by default/predetermination.

The present disclosure may propose the schemes for how to indicate repetition number information for Msg4 in NR with large coverage requirements scenarios (e.g., NTN) in order to guarantee the system performance as well as meet effective enhancements requirements for Msg4.

Illustrative Implementations

Figure 3:
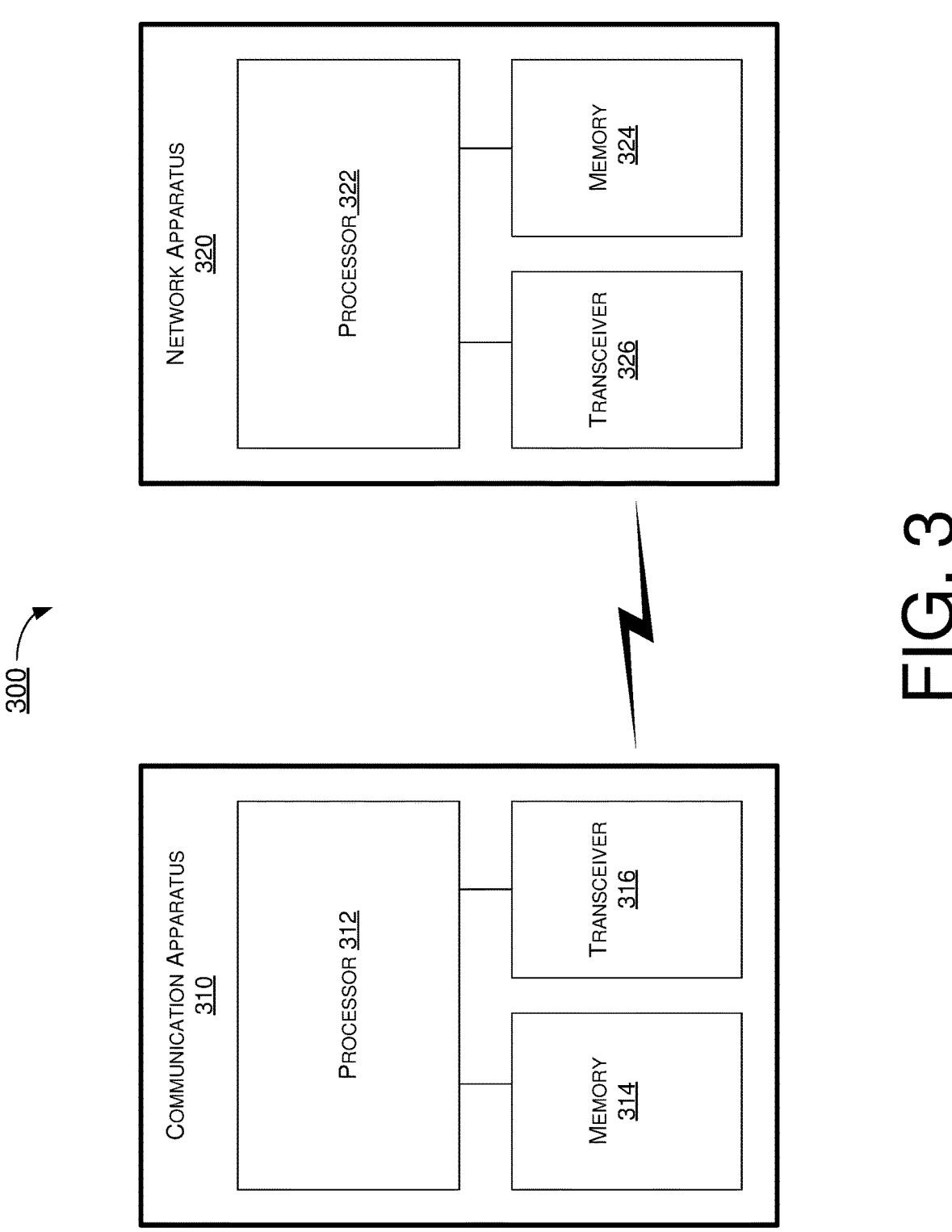
FIG. 3 is a block diagram of an example communication system in accordance with an implementation of the present disclosure.

FIG. 3 illustrates an example communication system 300 having at least an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to Msg4 transmission in mobile communications, including the various schemes described above with respect to various proposed designs, concepts, schemes and methods described above and with respect to user equipment and network apparatus in mobile communications, including scenarios/ schemes described above as well as process 400 and process 500 described below Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus or NTN apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of a network apparatus, which may be a network node such as a satellite, a base station, a small cell, a router or a gateway. For instance, network apparatus 320 may be implemented in an eNodeB in an LTE network, in a gNB in a 5G/NR, IoT, NB-IoT or IIoT network or in a satellite or base station in a 6G network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including autonomous reliability enhancements in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may determine whether at least one repetition factor for Msg4 is configured in a SIB from network apparatus 320. Processor 312 may determine whether an indication for Msg4 repetition is configured in a DCI from the network apparatus 220. Processor 312 may determine a number of repetitions for Msg4 based on at least one of the SIB and the DCI. Processor 312 may receive, via transceiver 316, one or more Msg4s from network apparatus 320 according to the number of repetitions for Msg4. Processor 312 may transmit, via transceiver 316, one or more Msg4 HARQ-ACKs to network apparatus 320 according to the number of repetitions for Msg4.

In some implementations, processor 312 may determine the number of repetitions for Msg4 based on only one repetition factor for Msg4 in the SIB or one of multiple repetition factors for Msg4 in the SIB in an event that no indication for Msg4 repetition is configured in the DCI. The repetition factor may be the largest one, the smallest one or the predefined one among the multiple repetition factors for Msg4 or is a value of 1.

In some implementations, processor 312 may determine the number of repetitions for Msg4 based on the DCI and the SIB in an event that the at least one repetition factor for Msg4 is configured in the SIB and the indication for Msg4 repetition or the repetition factor for Msg4 is configured in the DCI.

In some implementations, processor 312 may determine the number of repetitions for Msg4 based on the DCI in an event that no repetition factor for Msg4 is configured in the SIB and the indication for Msg4 repetition is configured in the DCI.

In some implementations, processor 312 may determine the number of repetitions for Msg4 is a value of 1 or one of a plurality of candidate values in an event that no repetition factor for Msg4 is configured in the SIB and the indication for Msg4 repetition is not configured in the DCI.

In some implementations, processor 312 may determine the number of repetitions for Msg4 via a parameter of pdsch-AggregationFactor in the SIB.

In some implementations, the determined number of repetitions for Msg4 may be applied to a PDSCH transmission using a common PDSCH resource in an event that a dedicated PDSCH resource is not configured. In some implementations, whether the determined number of repetitions for Msg4 is applied to a PDSCH transmission using the common PDSCH resource may be based on an enabled or disabled configuration from the SIB.

In some implementations, the indication for Msg4 repetition may be configured in a downlink assignment index field of the DCI, and wherein different values in the downlink assignment index field may respectively indicate different numbers of repetitions for Msg4 or respectively indicate different values of a parameter for Msg4 in the SIB.

In some implementations, the indication for Msg4 repetition may be configured in a modulation and coding scheme (MCS) information field of the DCI, and wherein different values of most significant bit (MSB) bits in the MCS information field may respectively indicate different numbers of repetitions for Msg4 or respectively indicate different values of a parameter for Msg4 in the SIB.

In some implementations, the indication for Msg4 repetition may be configured in a dedicated field of the DCI, and wherein different values in the dedicated field may respectively indicate different numbers of repetitions for Msg4 or respectively indicate different values of a parameter for Msg4 in the SIB.

In some implementations, the DCI may comprise a DCI format 1_0 with CRC scrambled by a TC-RNTI.

In some implementations, processor 322 may configure at least one repetition factor for Msg4 to communication apparatus 310 through at least one a SIB and a DCI. Processor 322 may transmit, via transceiver 326, one or more Msg4s to the UE according to the at least one repetition factor for Msg4. Processor 322 may receive, via transceiver 326, one or more Msg4 HARQ-ACKs from the UE according to the at least one repetition factor for Msg4 in at least one of the SIB and the DCI.

In some implementations, processor 322 may transmit, via transceiver 326, a parameter of pdsch-AggregationFactor in the SIB to configure at least one repetition factor for Msg4.

In some implementations, processor 322 may transmit, via transceiver 326, an indication for Msg4 repetition in the DCI to configure at least one repetition factor for Msg4. The indication for Msg4 repetition may be configured in a downlink assignment index field of the DCI, an MCS information field of the DCI, or a dedicated field of the DCI.

Illustrative Processes

FIG. 4 illustrates an example process 400 in accordance with an implementation of the present disclosure. Process 400 may be an example implementation of above scenarios/schemes, whether partially or completely, with respect to the Msg4 transmission with the present disclosure. Process 400 may represent an aspect of implementation of features of communication apparatus 310. Process 400 may include one or more operations, actions, or functions as illustrated by one or more of blocks 410, 420, 430, 440 and 450. Although illustrated as discrete blocks, various blocks of process 400 may be divided into additional blocks, combined into fewer blocks, or eliminated, depending on the desired implementation. Moreover, the blocks of process 400 may be executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of communication apparatus 310 determining whether at least one repetition factor for Msg4 is configured in a SIB from a network node. Process 400 may proceed from 410 to 420.

At 420, process 400 may involve processor 312 determining whether an indication for Msg4 repetition is configured in a DCI from the network node. Process 400 may proceed from 420 to 430.

At 430, process 400 may involve processor 312 determining a number of repetitions for Msg4 based on at least one of the SIB and the DCI. Process 400 may proceed from 430 to 440.

At 440, process 400 may involve processor 312 receiving, via transceiver 316, one or more Msg4s from the network node according to the number of repetitions for Msg4.

At 450, process 400 may involve processor 312 transmitting, via transceiver 316, one or more Msg4 HARQ-ACKs to the network node according to the number of repetitions for Msg4.

In some implementations, process 400 may involve processor 312 determining the number of repetitions for Msg4 based on only one repetition factor for Msg4 in the SIB or one of multiple repetition factors for Msg4 in the SIB in an event that no indication for Msg4 repetition is indicated in the DCI. The repetition factor may be the largest one, the smallest one or the predefined one among the multiple repetition factors for Msg4 or is a value of 1.

In some implementations, process 400 may involve processor 312 determining the number of repetitions for Msg4 based on the DCI and the SIB in an event that the at least one repetition factor for Msg4 is configured in the SIB and the indication for Msg4 repetition is configured in the DCI.

In some implementations, process 400 may involve processor 312 determining the number of repetitions for Msg4 based on the DCI in an event that the at least one repetition factor for Msg4 is not configured in the SIB and the indication for Msg4 repetition is configured in the DCI.

In some implementations, process 400 may involve processor 312 determining the number of repetitions for Msg4 is a value 1 or one of a plurality of candidate values in an event that no repetition factor for Msg4 is configured in the SIB and the indication for Msg4 repetition is not configured in the DCI.

In some implementations, process 400 may involve processor 312 determining the number of repetitions for Msg4 via a parameter of pdsch-AggregationFactor in the SIB.

FIG. 5 illustrates an example process 500 in accordance with an implementation of the present disclosure. Process 500 may be an example implementation of above scenarios/schemes, whether partially or completely, with respect to the Msg4 transmission with the present disclosure. Process 500 may represent an aspect of implementation of features of network apparatus 320. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may be executed in the order shown in FIG. 5 or, alternatively, in a different order. Process 500 may be implemented by network apparatus 320 or any base stations or network nodes. Solely for illustrative purposes and without limitation, process 500 is described below in the context of network apparatus 320. Process 500 may begin at block 510.

At 510, process 500 may involve processor 322 of network apparatus 320 configuring at least one repetition factor for Msg4 to a UE through at least one of a SIB and a DCI. Process 500 may proceed from 510 to 520.

At 520, process 500 may involve processor 322 transmitting, via transceiver 326, one or more Msg4s to the UE according to the at least one repetition factor for Msg4. Process 500 may proceed from 520 to 530.

At 530, process 500 may involve processor 322 receiving, via transceiver 326, one or more Msg4s HARQACKs from the UE according to the at least one repetition factor for Msg4 in at least one of the SIB and the DCI.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
determining, by a processor of a user equipment (UE), whether at least one repetition factor for Message 4 (Msg4) is configured in a system information block (SIB) from a network node; determining, by the processor, whether an indication for Msg4 repetition is configured in a downlink control information (DCI) from the network node;
determining, by the processor, a number of repetitions for Msg4 based on at least one of the SIB and the DCI;
receiving, by the processor one or more Msg4s from the network node according to the number of repetitions for Msg4; and
transmitting, by the processor, one or more Msg4 Hybrid Automatic Repeat Request (HARQ)-acknowledgements (ACKs) to the network node according to the number of repetitions for Msg4, wherein the determining of the number of repetitions for Msg4 based on at least one of the SIB and the DCI comprises determining the number of repetitions for Msg4 via a parameter of pdsch-AggregationFactor in the SIB, and wherein the DCI comprises a DCI format 1_0 with cyclic redundancy check (CRC) scrambled by a temporary cell-radio network temporary identifier (TC-RNTI).

2. The method of claim 1, wherein the determining of the number of repetitions for Msg4 based on at least one of the SIB and the DCI comprises:
determining, by the processor, the number of repetitions for Msg4 based on only one repetition factor for Msg4 in the SIB or one of a plurality of repetition factors for Msg4 in the SIB in an event that no indication for Msg4 repetition is configured in the DCI, wherein the one repetition factor is a largest, smallest or predefined one among the plurality of repetition factors for Msg4 or is a value of 1.

3. The method of claim 1, further comprising:
determining, by the processor, the number of repetitions for Msg4 based on the DCI and the SIB in an event that the at least one repetition factor for Msg4 is configured in the SIB and the indication for Msg4 repetition is configured in the DCI.

4. The method of claim 1, further comprising:
determining, by the processor, the number of repetitions for Msg4 based on the DCI in an event that no repetition factor for Msg4 is configured in the SIB and the indication for Msg4 repetition is configured in the DCI.

5. The method of claim 1, further comprising:
determining, by the processor, that the number of repetitions for Msg4 is a value of 1 or one of a plurality of candidate values in an event that no repetition factor for Msg4 is configured in the SIB and no indication for Msg4 repetition is configured in the DCI.

6. The method of claim 1, wherein the determined number of repetitions for Msg4 is applied to a physical downlink shared channel (PDSCH) transmission using a common PDSCH resource in an event that a dedicated PDSCH resource is not configured.

7. The method of claim 1, wherein whether the determined number of repetitions for Msg4 is applied to a PDSCH transmission using a common PDSCH resource in an event that a dedicated PDSCH resource is not configured is based on an enabled or disabled configuration from the SIB.

8. The method of claim 1, wherein the indication for Msg4 repetition is configured in a downlink assignment index field of the DCI, and wherein different values in the downlink assignment index field respectively indicate different numbers of repetitions for Msg4 or respectively indicate different values of a parameter for Msg4 in the SIB.

9. The method of claim 1, wherein the indication for Msg4 repetition is configured in a modulation and coding scheme (MCS) information field of the DCI, and wherein different values of most significant bit (MSB) bits in the MCS information field respectively indicate different numbers of repetitions for Msg4 or respectively indicate different values of a parameter for Msg4 in the SIB.

10. The method of claim 1, wherein the indication for Msg4 repetition is configured in a dedicated field of the DCI, and wherein different values in the dedicated field respectively indicate different numbers of repetitions for Msg4 or respectively indicate different values of a parameter for Msg4 in the SIB.

11. An apparatus, comprising:
a transceiver which, during operation, wirelessly communicates with at least one network node; and
a processor communicatively coupled to the transceiver such that, during operation, the processor performs operations comprising:
determining whether at least one repetition factor for Message 4 (Msg4) is configured in a system information block (SIB) from the network node;
determining whether an indication for Msg4 repetition is configured in a downlink control information (DCI) from the network node;
determining a number of repetitions for Msg4 based on at least one of the SIB and the DCI;

receiving, via the transceiver, one or more Msg4s from the network node based on the number of repetitions for Msg4; and transmitting, via the transceiver, one or more Msg4 Hybrid Automatic Repeat Request (HARQ)-acknowledgements (ACKs) to the network node according to the number of repetitions for Msg4, wherein, during operation, in determining the number of repetitions for Msg4 based on at least one of the SIB and the DCI, the processor is configured to determine the number of repetitions for Msg4 via a parameter of pdsch-Aggregation-Factor in the SIB, and wherein the DCI comprises a DCI format 1_0 with cyclic redundancy check (CRC) scrambled by a temporary cell-radio network temporary identifier (TC-RNTI).

12. The apparatus of claim 11, wherein, during operation, in determining the number of repetitions for Msg4 based on at least one of the SIB and the DCI, the processor is configured to perform operations comprising:

determining the number of repetitions for Msg4 based on only one repetition factor for Msg4 in the SIB or one of a plurality of repetition factors for Msg4 in the SIB in an event that no indication for Msg4 repetition is configured in the DCI, wherein the one repetition factor is a largest, smallest or predefined one among the plurality of repetition factors for Msg4 or is a value of 1.

13. The apparatus of claim 11, wherein, during operation, the processor is further configured to perform operations comprising:

determining the number of repetitions for Msg4 based on the DCI and the SIB in an event that the at least one repetition factor for Msg4 is configured in the SIB and the indication for Msg4 repetition is configured in the DCI.

14. The apparatus of claim 11, wherein, during operation, the processor is further configured to perform operations comprising:

determining the number of repetitions for Msg4 based on the DCI in an event that no repetition factor for Msg4 is configured in the SIB and the indication for Msg4 repetition is configured in the DCI.

15. The apparatus of claim 11, wherein, during operation, the processor is further configured to perform operations comprising:

determining that the number of repetitions for Msg4 is a value of 1 or one of a plurality of candidate values in an event that no repetition factor for Msg4 is configured in the SIB and no indication for Msg4 repetition is not configured in the DCI.

16. The apparatus of claim 11, wherein the determined number of repetitions for Msg4 is applied to a physical downlink shared channel (PDSCH) transmission using a common PDSCH resource in an event that a dedicated PDSCH resource is not configured.

17. The apparatus of claim 11, wherein the indication for Msg4 repetition is configured in a downlink assignment index field, a modulation and coding scheme (MCS) information field or a dedicated field of the DCI, and wherein different values in the downlink assignment index field, most significant bit (MSB) bits in the MCS information field or the dedicated field respectively indicate different numbers of repetitions for Msg4 or respectively indicate different values of a parameter for Msg4 in the SIB.

* * * * *